United States Patent [19]

Okada et al.

[11] Patent Number: 5,631,895
[45] Date of Patent: May 20, 1997

[54] OPTICAL INFORMATION RECORDING MEDIUM

[75] Inventors: Mitsuya Okada; Tatsunori Ide; Shuichi Ohkubo, all of Tokyo, Japan

[73] Assignee: NEC Corporation, Tokyo, Japan

[21] Appl. No.: 544,452

[22] Filed: Oct. 18, 1995

[30] Foreign Application Priority Data

Oct. 18, 1994 [JP] Japan .................. 6-251980

[51] Int. Cl.⁶ ............................... G11B 7/00
[52] U.S. Cl. .................. 369/275.1; 369/275.5; 369/283; 369/286; 369/100
[58] Field of Search ............... 369/275.1, 275.2, 369/275.5, 276, 283, 284, 285, 286, 13, 100, 288, 93, 94

[56] References Cited

U.S. PATENT DOCUMENTS

| | | | |
|---|---|---|---|
| 4,649,451 | 3/1987 | Tomita | 369/13 X |
| 5,214,636 | 5/1993 | Ishikawa et al. | 369/286 |
| 5,232,790 | 8/1993 | Arimune et al. | 369/13 X |
| 5,442,619 | 8/1995 | Van Uijemn et al. | 369/275.2 |
| 5,521,901 | 5/1996 | Okada et al. | |

FOREIGN PATENT DOCUMENTS

| | | |
|---|---|---|
| 1149239 | 6/1989 | Japan . |
| 2128330 | 5/1990 | Japan . |
| 4102243 | 4/1992 | Japan . |
| 4252442 | 9/1992 | Japan . |
| 5145299 | 6/1993 | Japan . |

*Primary Examiner*—Muhammad N. Edun
*Attorney, Agent, or Firm*—Sughrue, Mion, Zinn, Macpeak & Seas

[57] ABSTRACT

An optical information recording medium includes a transparent substrate, a first protection film, a recording film, a second protection film, a dielectric film, and a dielectric reflective film. The first protection film is formed on the transparent substrate. The recording film is formed on the first protection film to record and erase information by causing a reversible phase change between a crystalline state and an amorphous state upon being irradiated with a laser beam, and reproduce recorded information by detecting a change in optical nature accompanying the phase change in the recording film. The second protection film is formed on the recording film to protect the recording film together with the first protection film. The dielectric film is formed on the second protection film and has a refractive index lower than a refractive index of the transparent substrate. The dielectric reflective film is formed on the dielectric film and has a refractive index higher than the refractive index of the transparent substrate.

11 Claims, 5 Drawing Sheets

OPTICAL INFORMATION RECORDING MEDIUM

BACKGROUND OF THE INVENTION

The present invention relates to an optical information recording medium and, more particularly, to a phase change type optical information recording medium in which a structure is reversibly changed between the crystalline and amorphous states, and an optical nature is changed in accordance with a thermal hysteresis such as temperature rise and cooling by being irradiated with a laser beam.

Since the recording scheme for an optical information recording medium employing a laser beam, and particularly the recording scheme for a disk-shaped optical information recording medium (to be referred to as an optical disk hereinafter) enable large-capacity recording and high-speed access in the non-contact manner, they have been put into practical use in the form of large-capacity memories. Optical disks are classified into ROM optical disks known as compact disks (CD) and laser disks, write-once optical disks on which the user can record information, and re-writable optical disks on and from which the user can repeatedly record and erase information. The write-once and re-writable optical disks are used as external memories for computers, or document and image files.

The re-writable optical disks include a phase change type optical disk that utilizes the phase change of a recording film and a magneto-optical disk that utilizes changes in magnetization direction of a perpendicular magnetized film. Of these disks, the phase change type optical disk is expected to be popular as a re-writable optical disk because it does not require an external magnetic field and can easily perform an overwrite operation.

Conventionally, the phase change type optical disk capable of a write access using a recording film that undergoes a phase change between the crystalline phase and the amorphous phase in accordance with laser beam irradiation has been used. A laser beam spot having a high power in accordance with information to be recorded on the recording film is irradiated on the phase change type optical disk to locally increase the temperature of the recording film. Thus, a phase change between the crystalline phase and the amorphous phase is caused to perform recording. A change in optical constant accompanying this phase change is read by a low-power laser beam as a difference in intensity of the reflected light, thereby reproducing the information.

For example, when a phase change type optical disk using a recording film having a comparatively long crystallization time is employed, the optical disk is rotated, a laser beam is irradiated on the recording film formed on the optical disk to heat a portion of the recording film to a temperature equal to or higher than the melting temperature. After the laser beam passes, the heated portion is rapidly cooled to set this portion in the amorphous state, thereby performing recording.

For erasing, the recording film is held within a crystallization enable temperature which is greater than or equal to a crystallization temperature and less than the melting temperature for a sufficiently long period of time required for promoting crystallization, so that the recording film is crystallized. As a method for this, a method of irradiating a laser beam having an elliptic spot in the laser beam traveling direction of the disk is known. To perform a pseudo-overwrite operation with two beams in which new information is recorded while erasing already recorded data, an erasing laser beam having an elliptic spot is irradiated to the recording film preceding a recording laser beam having a circular spot.

When a disk using an information recording film capable of high-speed crystallization is employed, a single laser beam focused to have a circular spot is used. According to a conventional method, a phase change between the crystalline and amorphous states is caused by changing the power of the laser beam between two levels. More specifically, when a laser beam having a high power that can heat the recording film to a temperature equal to the melting temperature or more is irradiated on the recording film, most of the recording film is set in the amorphous state upon being cooled. Meanwhile, when a laser beam having a low power that heats the recording film to a temperature which is greater than or equal to the crystallization temperature and less than the melting temperature is irradiated on the recording film, most of the recording film is set in the crystalline state.

To form the recording film of a phase change type optical disk, GeSbTe, InSbTe, InSe, InTe, AsTeGe, $TeO_x$-GeSn, TeSeSn, SbSeBi, or BiSeGe belonging to a chalcogenide-based material is employed. Any material is deposited in accordance with resistance heating vacuum deposition, electron beam vacuum deposition, sputtering, or the like. The recording film immediately after deposition is set in a kind of amorphous state. The entire recording film is set in the crystalline state by initialization so that an amorphous recorded portion is formed upon recording information on the recording film. Recording is achieved by forming an amorphous portion in the recording film which is in the crystalline state.

As a conventional technique for performing high-density recording in such a phase change type optical disk, a mark edge recording scheme of recording information at a recording mark edge has been proposed. In recording information at a mark edge, the edge position must be accurate. Fluctuations in edge position greatly limit high-density recording. The main cause of this edge fluctuation is an absorption difference between the amorphous and crystalline states. To suppress this edge fluctuation, it is importance to set the absorption of a portion in the crystalline state higher than that of an amorphous portion.

A well-known optical disk using a metal reflective film has an arrangement in which a reflectance difference between portions in the crystalline and amorphous states is set large. In general, since the reflectance of the crystalline portion is set higher than that of the amorphous portion, the absorption of the amorphous portion is inevitably increased to increase the mark edge fluctuation in overwrite recording, as described above.

Absorption control will be described below in detail. A well-known phase change type optical disk has a four-layered reflective film arrangement in which a first protection film 2, a recording film 3, a second protection film 4, a metal reflective film 5, and an ultraviolet-curing resin 6 are sequentially stacked on a transparent substrate 1, as shown in a sectional view of FIG. 3.

In general, the above-described arrangement is employed in which the reflectance of an amorphous portion is set lower than that of a crystalline portion, thereby assuring a reproduced signal by setting the reflectance of the crystalline portion higher than that of the amorphous portion. In this case, a change in optical constant accompanying a phase change in recording film can be effectively converted into a change in reflectance, thereby assuring a good reproduced signal. To the contrary, most of light is reflected by the metal reflective film 5. For this reason, if a large reflectance difference accompanying the change in the optical constant of the recording film 3 is to be assured, the absorption of the crystalline portion of the recording film 3 inevitably becomes lower than that of the amorphous portion.

If the absorption of the crystalline portion is decreased in this manner, the temperature rise state of the recording film varies depending on the crystalline or amorphous state of the recording film in an overwrite operation because the thermal conductivity in the crystalline state is higher than that in the amorphous state, and the latent heat energy required for melting is also larger. Therefore, an overwrite signal is modulated due to a signal component before an overwrite operation. This is one factor of the mark edge fluctuation which limits a decrease in overwrite jitter.

To eliminate this mark edge fluctuation, three methods have been proposed: ① a method using a very thin metal reflective film; ② a method using a transparent high-refractive-index dielectric material as a reflective film; and ③ a method in which information is reproduced using an optical phase difference, and the absorption is set with a certain degree of freedom.

In the first method, gold (Au) is used as a very thin metal reflective film, and the optical absorption of the recording film in the crystalline state is set equal to that in the amorphous state to obtain a similar temperature rise profile in view of time and space (Japanese Patent Laid-Open No. 1-149238). In this conventional method, however, the metal reflective film is as thin as, e.g., 20 nm, so that the repeated overwrite characteristics are poor.

The second method using a transparent high-refractive-index dielectric material as a reflective film uses a transparent high-refractive-index dielectric material made of silicon (Si) as a reflective film (Japanese Patent Laid-Open No. 4-102243). That is, according to this method, an optical information recording medium has an arrangement in which a first protection film 2, a recording film 3, a second protection film 4, and a high-refractive-index dielectric reflective film 7 made of Si, and an ultraviolet-curing resin 6 are sequentially stacked on a substrate 1.

FIG. 5 shows the dependence of the reflectance and transmittance of a conventional optical information recording medium on the film thickness of the first protection film 2 as a lower protection film. As shown in FIG. 5, with a change in the film thickness of the first protection film 2, an absorption I of a portion in the crystalline state, an absorption II of a portion in the amorphous state, a reflectance III of the portion in the crystalline state, and a reflectance IV of the portion in the amorphous state change. The absorption I of the portion in the crystalline state is always higher than the absorption II of the portion in the amorphous state, while the reflectance of the portion in the crystallin state is always higher than the reflectance IV of the portion in the amorphous state. That is, as is apparent from FIG. 5, even if the thickness of the first protection film 2 changes, the conventional optical information recording medium has a transmittance of 15% or more, so that the absorption is decreased to decrease the recording sensitivity.

In addition, an optical information recording medium using a diamond-shaped thin film as a reflective film is well known (Japanese Patent Laid-Open No. 4-252442). In this optical information recording medium, a difference between the absorptions of crystalline and amorphous portions is decreased, while a high thermal conductivity, a refractive index higher than that of a polycarbonate substrate, and a large difference between the reflectances of the crystalline and amorphous portions are kept. However, a transmitted light quantity tends to increase to decrease the recording sensitivity.

An optical information recording medium according to the third method in which information is reproduced using an optical phase difference, and the absorption is set with a certain degree of freedom is well known (Japanese Patent Laid-Open No. 5-145299). According to this method, however, a film thickness margin of each layer such as a recording film or protection film tends to be small.

Note that, as another conventional optical information recording medium, an optical information recording medium is well known in which the first protection film of a recording film has a film thickness of 100 nm, the absorptions of the recording film in the amorphous and crystalline states are 0.5 or more, respectively, and the film thicknesses of the second protection film and the recording film are set to have values which satisfy a predetermined inequality in association with the absorptions of the recording film in the amorphous and crystalline states (Japanese Patent Laid-Open No. 2-128330).

Taking light multiple reflection into consideration, an absorption contrast is set at 0.05 or less in the conventional optical information recording medium. However, the absorption of a medium corresponding to mark edge recording is not described in this prior application. In this prior application, only a decrease in difference between the absorption of a portion in the crystalline state and the absorption of a portion in the amorphous state is defined.

SUMMARY OF THE INVENTION

It is an object of the present invention to provide an optical information recording medium having improved overwrite characteristics of a phase change type optical disk and enabling high-density recording.

It is another object of the present invention to provide an optical information recording medium in which a decrease in recording sensitivity is suppressed, while properly controlling an absorption.

In order to achieve the above objects of the present invention, there is provided an optical information recording medium comprising a transparent substrate, a first protection film formed on the transparent substrate, a recording film, formed on the first protection film, for recording and erasing information by causing a reversible phase change between a crystalline state and an amorphous state upon being irradiated with a laser beam, and reproducing recorded information by detecting a change in optical nature accompanying the phase change in the recording film, a second protection film, formed on the recording film, for protecting the recording film together with the first protection film, a dielectric film formed on the second protection film and having a refractive index lower than a refractive index of the transparent substrate, and a dielectric reflective film formed on the dielectric film and having a refractive index higher than the refractive index of the transparent substrate.

DESCRIPTION OF THE PREFERRED EMBODIMENT

Figure 1:
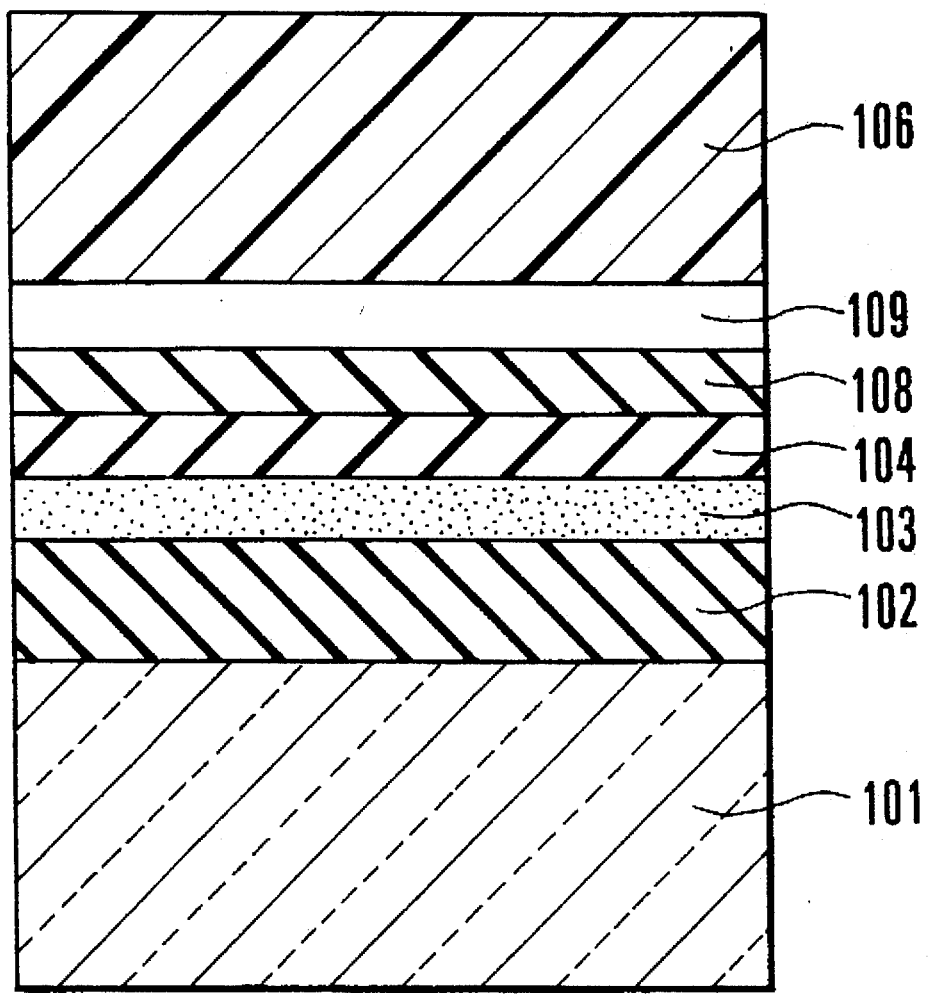
FIG. 1 is a sectional view showing the structure of an optical recording medium according to an embodiment of the present invention.

An embodiment of the present invention will be described below. FIG. 1 shows the structure of an optical recording medium according to an embodiment of the present invention. As shown in FIG. 1, this embodiment has an arrangement in which a first protection film 102, a recording film 103, a second protection film 104, a low-refractive-index dielectric film 108, a high-refractive-index dielectric reflective film 109, and a protection ultraviolet-curing resin 106 are sequentially stacked on a transparent substrate 101. The first protection film 102 and the second protection film 104 sandwich the recording film 103 to protect it. The recording layer 103 causes a reversible phase change between the crystalline state and the amorphous state upon being irradiated with a laser beam, in order to record and erase information. The information recorded in the recording film 103 is reproduced by detecting a change in optical nature accompanying the phase change in the recording film 103 with a laser beam. The low-refractive-index dielectric film 108 consists of a dielectric material having a low refractive index and controls the reflectance and absorption characteristics of the recording film 103. The high-refractive-index dielectric reflective film 109 consists of a dielectric material having a high refractive index and controls the reflectance of light incident from the substrate 101 by properly setting a film thickness. The ultraviolet-curing resin 106 consists of a resin cured with ultraviolet rays and prevents the surface of the optical disk having the above-described multi-layered structure from being damaged.

The characteristic feature of this embodiment is that the reflectance and absorption characteristics are controlled by the low-refractive-index dielectric film 108 formed on the second protection film 104 to increase the absorption of a crystalline portion, and that the absorption is increased by suppressing transmitted light components to assure good recording sensitivity characteristics.

A disk-shaped glass or plastic member is used as the substrate 101. Examples of the dielectric material of the first protection film 102 and the second protection film 104 are silicon dioxide ($SiO_2$), silicon nitride ($Si_3N_4$), aluminum nitride (AlN), titanium dioxide ($TiO_2$), zinc sulfide (ZnS), ZnS—$SiO_2$, and the like.

Examples of the phase change type recording material of the recording film 103 are GeSbTe, InSbTe, InSe, InTe, AsTeGe, $TeO_x$-GeSn, TeSeSn, SbSeBi, or BiSeGe belonging to the chalcogenide-based material.

The low-refractive-index dielectric film 108 consists of a material having a refractive index lower than a reference refractive index such as the refractive index (1.41 to 1.58) of the material of the transparent substrate 101 and the refractive index (about 2.1) of the first protection film 102 or the second protection film 104. Examples of such a material of the low-refractive-index dielectric film 108 are magnesium fluoride ($MgF_2$), calcium fluoride ($CaF_2$), sodium fluoride ($NaF_2$), lithium fluoride ($LiF_2$), and $Na_3AlF_6$. The high-refractive-index dielectric reflective film 109 is a reflective film consisting of a transparent high-refractive-index material having a refractive index higher than the reference refractive index, e.g., Si or germanium (Ge).

The characteristic feature of this embodiment is in the arrangement of an optical disk in which a decrease in recording sensitivity is suppressed, and an absorption difference is controlled, and in that the reflectance of an amorphous recording mark is set higher than that of a crystalline portion to set the absorption of the crystalline portion higher than that of the amorphous recording mark.

Figure 2:
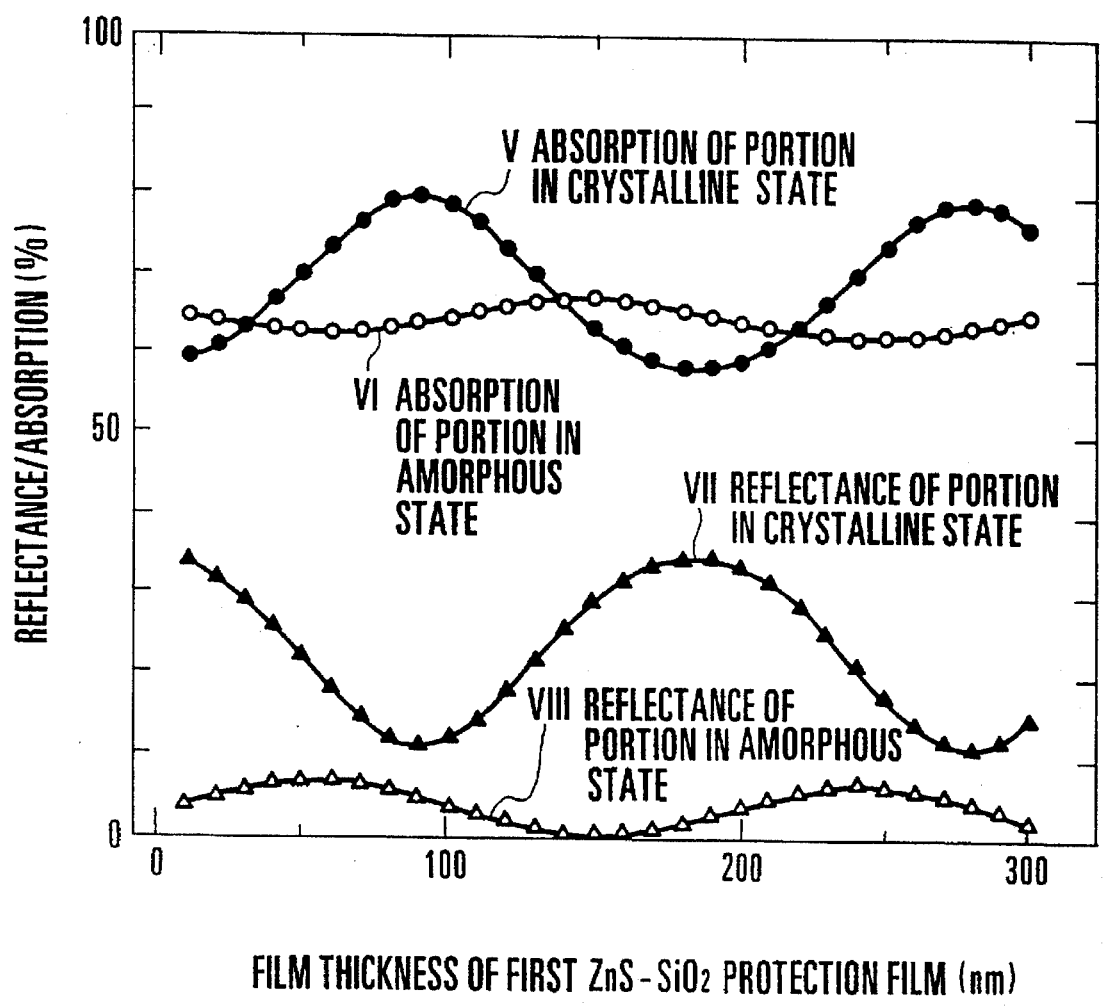
FIG. 2 is a graph showing changes in reflectance and absorption with respect to the film thickness of the first protection film shown in FIG. 1.
Figure 3:
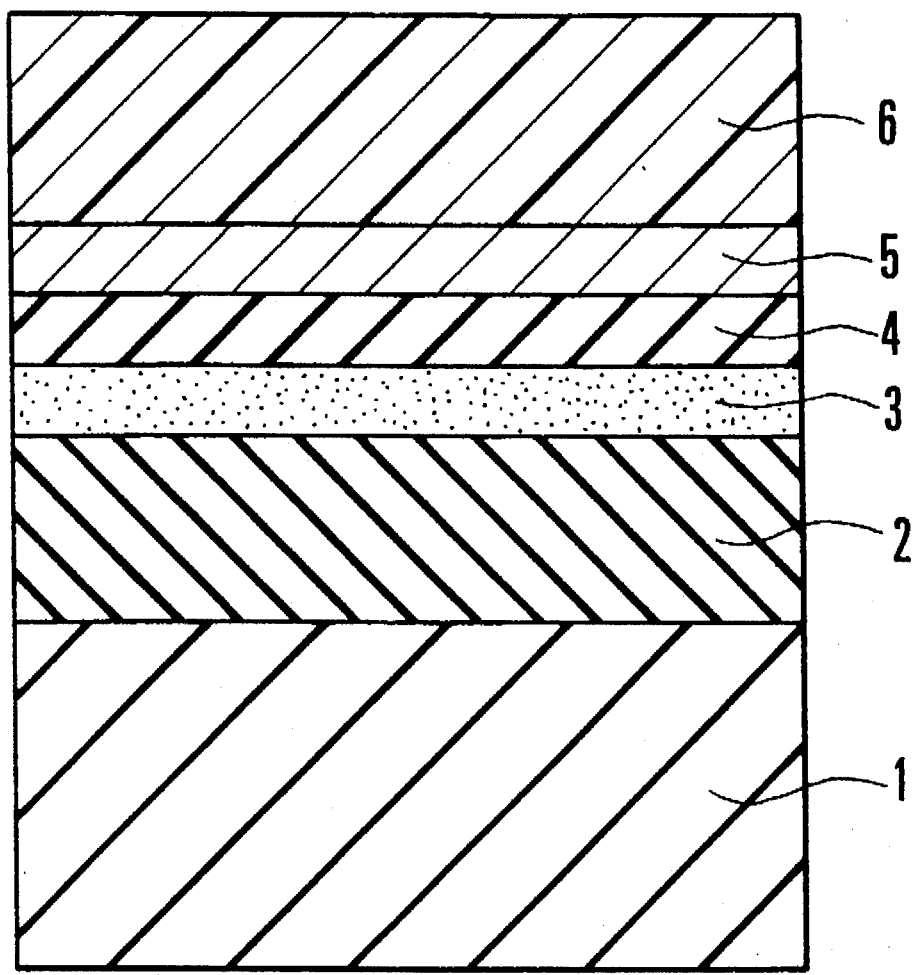
FIG. 3 is a sectional view showing the structure of a conventional optical recording medium.

FIG. 2 shows an absorption characteristic V of a portion in the crystalline state, an absorption characteristic VI of a portion in the amorphous state, a reflectance characteristic VII of the portion in the crystalline state, and a reflectance characteristic VIII of the portion in the amorphous state obtained by changing the film thickness of the first protection film 102 made of ZnS—$SiO_2$. In addition, these characteristics are obtained when the film thickness of the recording film 103 made of GeSbTe is set at 20 nm, that of the second protection film 104 made of ZnS—$SiO_2$ is set at 20 nm, that of the low-refractive-index dielectric film made of $MgF_2$ is set at 20 nm, and that of the high-refractive-index dielectric reflective film 109 made of Si is set at 60 nm.

Figure 5:
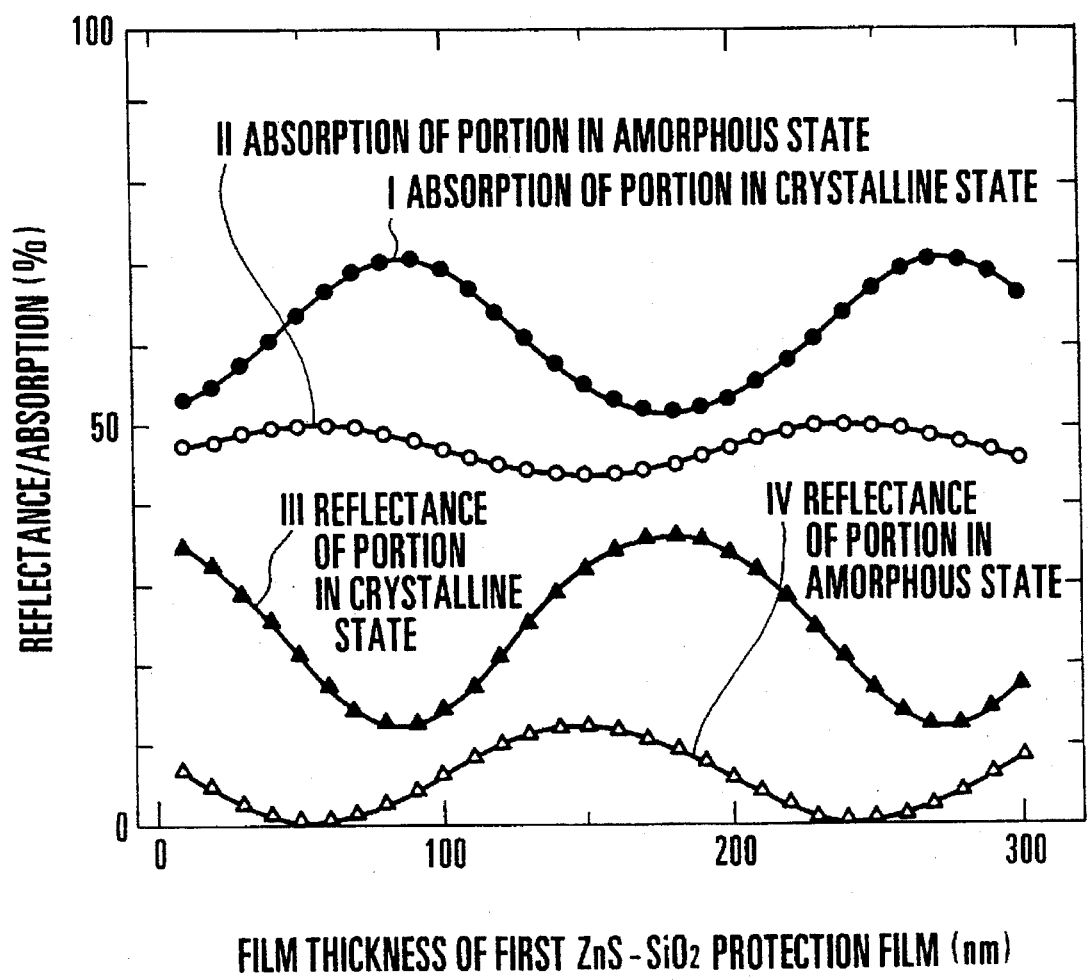
FIG. 5 is a graph showing changes in reflectance and absorption with respect to the film thickness of the first protection film shown in FIG. 4.

As is apparent from the characteristics V and VI shown in FIG. 2, when the film thickness of the first protection film 102 falls within the range of 50 nm to 120 nm or 240 nm to 300 nm, the following desired conditions can be satisfied. That is, the absorption of the portion in the crystalline state becomes higher than that in the amorphous state and 10% higher than the conventional absorption of the portion in the crystalline state shown in FIG. 5, thereby increasing the sensitivity.

The detailed arrangement of this embodiment will be described below. A laser set to have a wavelength of 830 nm was used. The arrangement of an optical disk was determined such that the reflectance of an amorphous recording mark was set higher than that of a crystalline portion to set the absorption of the crystalline portion higher than that of the amorphous portion. An optical disk having this arrangement was formed. A pre-grooved polycarbonate substrate having a diameter of 130 mm and a thickness of 1.2 mm was used as the substrate 101.

The first and second protection films 102 and 104, the recording film 103, the low-refractive-index dielectric film 108, and the high-refractive-index dielectric reflective film 109 were continuously formed by magnetron sputtering using a ZnS—$SiO_2$ mixed film, GeSbTe, $MgF_2$, and Si, respectively. The film thickness of the first protection film 102 was 290 nm; that of the recording film 103, 20 nm; that of the second protection film 104, 20 nm; that of the low-refractive-index dielectric film 108, 20 nm; and that of the high-refractive-index dielectric reflective film 109, 60 nm. In the optical disk having this arrangement, the absorption of the crystalline portion was 79% with respect to a wavelength of 830 nm, that of the amorphous portion was 63%, the reflectance of the crystalline portion was 13%, and that of the amorphous portion was 4%.

An overwrite operation was performed on the disk having the above arrangement, and the characteristics were evaluated. For measurement, an optical head having a 830-nm wavelength semiconductor laser mounted on it was used. While the disk after initialization was rotated at 3,600 r.p.m., an 8.4-MHz signal (duty: 50%) and a 2.2-MHz signal (duty: 50%) were alternatively overwritten on tracks within a diameter of 30 mm. The recording power and the erasing power were respectively set to 10 mW and 5 mW so that the second harmonic distortion of the reproduced signal becomes the minimum.

The jitter of the reproduced signal in the overwrite operation as a pulse value obtained by second differential method was 2.8 ns. It was confirmed that the optical disk had an overwrite jitter characteristic almost as good as that in initial recording immediately after initialization.

Figure 4:
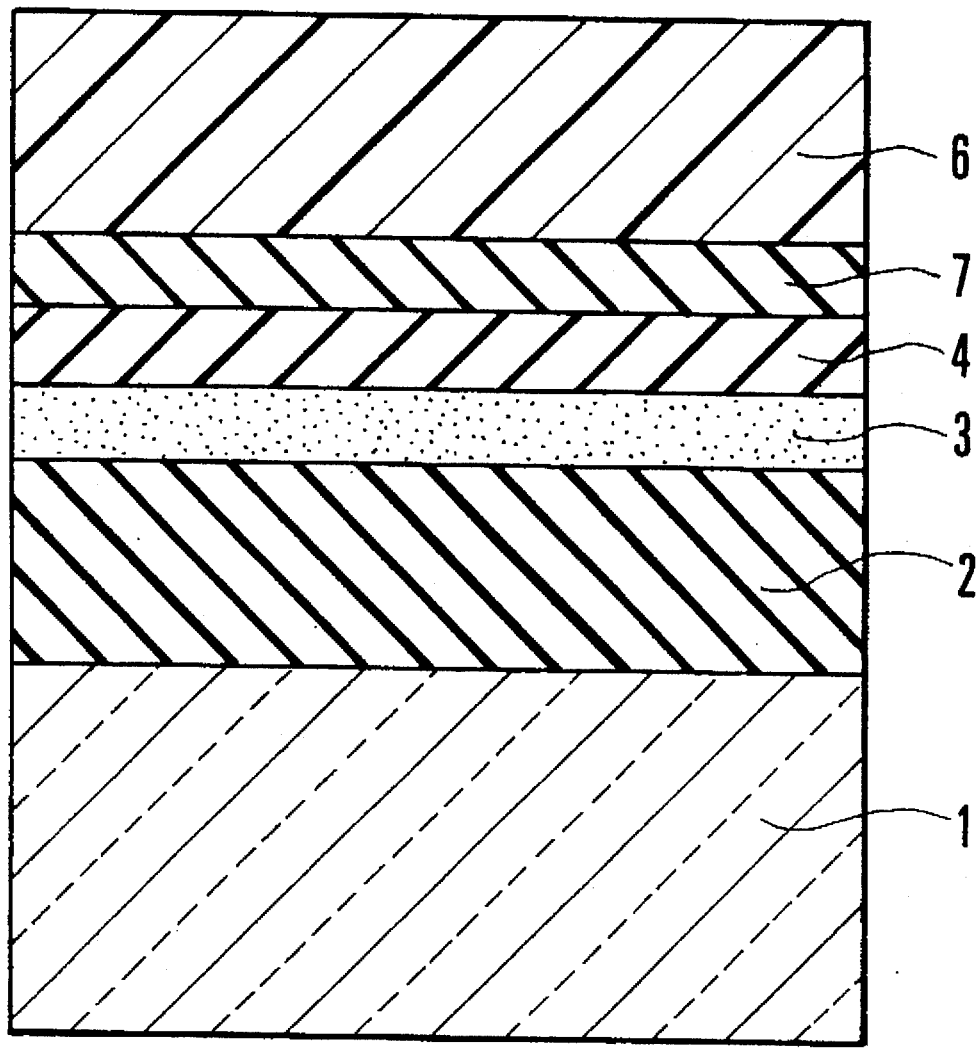
FIG. 4 is a sectional view showing the structure of another conventional optical recording medium.

As a comparative example, an optical disk having the arrangement shown in FIG. 4 in which no low-refractive-index dielectric film was used was formed. Similar to this embodiment, a pre-grooved polycarbonate substrate having a diameter of 130 mm and a thickness of 1.2 mm was used as a substrate 1. First and second protection films 2 and 4, a recording film 3, and a reflective film 7 were continuously formed by magnetron sputtering using a ZnS—$SiO_2$ mixed film, GeSbTe, and Si, respectively.

The film thickness of the first protection film 2 was 270 nm; that of the recording film 3, 20 nm; that of the second protection film 4, 18 nm; and that of the high-refractive-index dielectric reflective film 7, 65 nm. In the optical disk having this arrangement, the absorption of a crystalline portion was 70% with respect to a wavelength of 830 nm, that of an amorphous portion was 50%, the reflectance of the crystalline portion was 15%, and that of the amorphous portion was 4%.

An overwrite operation was performed on this disk (comparative example), and the characteristics were evaluated. For measurement, similar to the embodiment of the present invention, the optical head having the 830-nm wavelength semiconductor laser mounted on it was used. While the disk after initialization was rotated at 3,600 r.p.m., an 8.4-MHz signal (duty: 50%) and a 2.2-MHz signal (duty: 50%) were alternatively overwritten on tracks within a diameter of 30 mm. The recording power and the erasing power were respectively set to 11.5 mW and 6 mW so that the second harmonic distortion of the reproduced signal becomes the minimum. It was confirmed that the recording power required for the optical disk of the comparative example was higher than that in this embodiment.

Note that the present invention is not limited to the above embodiment. For example, the low-refractive-index dielectric film 108 may be constituted by a multi-layered film consisting of materials of $MgF_2$, $CaF_2$, $NaF_2$, $LiF_2$, and $Na_3AlF_6$.

As has been described above, according to the present invention, the low-refractive-index dielectric film is inserted between the transparent high-refractive-index dielectric reflective film and the second protection film to set the absorption of the portion in the crystalline state higher than the conventional absorption. While assuring a sufficient recording sensitivity with respect to a laser wavelength to be used, the reflectance of an amorphous recording mark is set higher than that of a crystalline portion to set the absorption of the crystalline portion higher than that of the amorphous portion. According to the present invention, therefore, a mark shape distortion occurring in an overwrite operation can be suppressed, so that an increase in the jitter of a reproduced signal in the overwrite operation is suppressed, thereby realizing high-density recording.

Further, according to the present invention, the reflective film can be set thicker than the conventional recording medium using a very thin metal reflective film, so that the resistance to repeated overwrite operations can be increased. Still further, the recording medium of the present invention is arranged unlike the conventional recording medium in which information is reproduced using a optical phase difference. For this reason, the degree of freedom of a film thickness margin of each layer becomes larger than that of the conventional recording medium. Moreover, the absorption of the portion in the crystalline state is higher than that of the conventional recording medium, thereby increasing the recording sensitivity.

What is claimed is:

1. An optical information recording medium, comprising:

a transparent substrate;

a first protection film formed on said transparent substrate;

a recording film, formed on said first protection film, for recording and erasing information by causing a reversible phase change between a crystalline state and an amorphous state upon being irradiated with a laser beam, and reproducing recorded information by detecting a change in optical nature accompanying the phase change in said recording film;

a second protection film, formed on said recording film, for protecting said recording film together with said first protection film;

a dielectric interference film, formed on said second protection film and having a refractive index lower than a refractive index of said transparent substrate, for controlling a reflectance characteristic and an absorption characteristic of said recording film; and a dielectric reflective film formed on said dielectric interference film and having a refractive index higher than the refractive index of said transparent substrate, for controlling a reflectance of light incident from said transparent substrate.

2. A medium according to claim 1, wherein said dielectric interference film consists of one material selected from the group consisting of $MgF_2$, $CaF_2$, $NaF_2$, $LiF_2$, and $Na_3AlF_6$.

3. A medium according to claim 1, wherein said dielectric interference film is constituted by a multi-layered film consisting of not less than two materials selected from the group consisting of $MgF_2$, $CaF_2$, $NaF_2$, $LiF_2$, and $Na_3AlF_6$.

4. A medium according to claim 1, wherein said dielectric reflective film consists of one of Si and Ge.

5. A medium according to claim 1, wherein said first and second protection films consist of ZnS—$SiO_2$.

6. A medium according to claim 1, wherein said recording film consists of a chalcogenide-based material.

7. A medium according to claim 1, wherein said dielectric interference reflective film controls a reflectance of light incident from said transparent substrate by setting a film thickness, and said dielectric film is inserted between said dielectric reflective film and said second protection film to control a reflectance characteristic and an absorption characteristic of said recording film.

8. A medium according to claim 1, wherein an ultraviolet-curing resin is formed on said dielectric reflective film.

9. An optical information recording medium comprising:

a transparent substrate;

a first protection film formed on said transparent substrate;

a recording film, formed on said first protection film, for recording and erasing information by causing a reversible phase change between a crystalline state and an amorphous state in accordance with a difference in thermal hysteresis such as temperature rise and cooling upon being irradiated with a laser beam, and reproducing recorded information by detecting a change in optical nature accompanying the phase change in said recording film;

a second protection film, formed on said recording film, for protecting said recording film together with said first protection film;

a dielectric film, formed on said second protection film and having a refractive index lower than a refractive index of said transparent substrate, for controlling a reflectance characteristic and an absorption characteristic of said recording film; and a transparent reflective film, formed on said dielectric film and having a refractive index higher than the refractive index of said transparent substrate, for controlling a reflectance of light incident from said transparent substrate by setting a film thickness.

10. A medium according to claim 9, wherein said dielectric film consists of at least one material selected from the group consisting of $MgF_2$, $CaF_2$, $NaF_2$, $LiF_2$, and $Na_3AlF_6$.

11. An optical information recording medium, comprising:

a transparent substrate;

a first protection film formed on said transparent substrate;

a recording film, formed on said first protection film;

a second protection film, formed on said recording film;

a dielectric interference film, formed on said second protection film and having a refractive index lower than a refractive index of said transparent substrate; and a dielectric reflective film formed on said dielectric interference film and having a refractive index higher than the refractive index of said transparent substrate.

* * * * *